(12) United States Patent
Lee et al.

(10) Patent No.: US 10,657,978 B2
(45) Date of Patent: May 19, 2020

(54) BROADCAST TRANSMITTING APPARATUS AND BROADCAST TRANSMITTING METHOD FOR PROVIDING AN OBJECT-BASED AUDIO, AND BROADCAST PLAYBACK APPARATUS AND BROADCAST PLAYBACK METHOD

(71) Applicant: Electronics and Telecommunications Research Institute, Daejeon (KR)

(72) Inventors: Yong Ju Lee, Daejeon (KR); Tae Jin Lee, Daejeon (KR); Kyeong Ok Kang, Daejeon (KR); Jin Woong Kim, Daejeon (KR); Chie Teuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/262,144

(22) Filed: Jan. 30, 2019

(65) Prior Publication Data
US 2019/0164560 A1     May 30, 2019

Related U.S. Application Data

(63) Continuation of application No. 15/230,616, filed on Aug. 8, 2016, now Pat. No. 10,217,473, which is a (Continued)

(30) Foreign Application Priority Data

Dec. 22, 2010    (KR) ........................ 10-2010-0132665

(51) Int. Cl.
*G10L 19/16*      (2013.01)
*G10L 19/008*    (2013.01)
(Continued)

(52) U.S. Cl.
CPC .......... *G10L 19/167* (2013.01); *G10L 19/008* (2013.01); *G10L 19/20* (2013.01);
(Continued)

(58) Field of Classification Search
CPC ....... G10L 19/00; G10L 19/008; G10L 19/20; G10L 19/16; G10L 19/167; H04H 20/88;
(Continued)

(56) References Cited

U.S. PATENT DOCUMENTS 7,987,096 B2 *   7/2011   Kim ...................... G10L 19/008
                                                      704/500
9,105,264 B2 *   8/2015   Ishikawa ............... G10L 19/008
(Continued)

FOREIGN PATENT DOCUMENTS

KR     10-2007-0047192 A     5/2007
KR     10-2008-0035448 A     4/2008
(Continued)

OTHER PUBLICATIONS

J. Engdegard et al., "Spatial Audio Object Coding (SAOC)—The Upcoming MPEG Standard on Parametric Object Based Audio Coding," Proceedings from the 124th Convention at the Audio Engineering Society, presented on May 17-20, 2008, at Amsterdam, The Netherlands pp. 1-15.
(Continued)

*Primary Examiner* — Thang V Tran
(74) *Attorney, Agent, or Firm* — NSIP Law

(57) ABSTRACT

A broadcast transmitting apparatus and method, and a broadcast playback apparatus and method for providing an object-based audio by encoding and decoding a multichannel audio signal are provided. The broadcast transmitting apparatus may generate audio identification information used to determine whether the multichannel audio signal is an object-based audio signal. When the multichannel audio signal is
(Continued)

determined to be the object-based audio signal, based on the audio identification information, the broadcast playback apparatus may control and output the multichannel audio signal for each channel.

4 Claims, 4 Drawing Sheets

Related U.S. Application Data continuation of application No. 13/996,852, filed as application No. PCT/KR2011/009971 on Dec. 22, 2011, now Pat. No. 9,412,384.

(51) Int. Cl.
| | | |
|---|---|---|
| *H04H 20/88* | (2008.01) | |
| *H04H 20/89* | (2008.01) | |
| *H04H 20/95* | (2008.01) | |
| *H04N 21/233* | (2011.01) | |
| *H04N 21/439* | (2011.01) | |
| *H04N 21/81* | (2011.01) | |
| *G10L 19/20* | (2013.01) | |

(52) U.S. Cl.
CPC ............ *H04H 20/89* (2013.01); *H04H 20/95* (2013.01); *H04N 21/2335* (2013.01); *H04N 21/4394* (2013.01); *H04N 21/8106* (2013.01)

(58) Field of Classification Search
CPC .... H04H 20/89; H04H 20/95; H04N 21/4394; H04N 21/8106; H04S 3/00; H04S 3/002; H04S 3/008; H04S 3/02
See application file for complete search history.

(56) References Cited

U.S. PATENT DOCUMENTS

| | | | |
|---|---|---|---|
| 9,299,352 B2* | 3/2016 | Seo | G10L 19/008 |
| 9,412,384 B2* | 8/2016 | Lee | H04H 20/89 |
| 9,685,167 B2* | 6/2017 | Seo | G10L 19/20 |
| 2004/0111171 A1 | 6/2004 | Jang et al. | |
| 2006/0293902 A1 | 12/2006 | Kim et al. | |
| 2009/0157411 A1* | 6/2009 | Kim | G10L 19/008 |
| | | | 704/500 |
| 2009/0216542 A1* | 8/2009 | Pang | G10L 19/008 |
| | | | 704/500 |
| 2009/0265164 A1 | 10/2009 | Yoon et al. | |
| 2010/0114582 A1 | 5/2010 | Beack et al. | |
| 2010/0174548 A1 | 7/2010 | Beack et al. | |
| 2010/0189281 A1 | 7/2010 | Oh et al. | |
| 2010/0296656 A1 | 11/2010 | Oh et al. | |
| 2011/0022402 A1* | 1/2011 | Engdegard | G10L 19/20 |
| | | | 704/501 |
| 2011/0112842 A1* | 5/2011 | Seo | G10L 19/008 |
| | | | 704/500 |
| 2012/0143613 A1* | 6/2012 | Herre | G10L 19/008 |
| | | | 704/500 |
| 2012/0177204 A1* | 7/2012 | Hellmuth | G10L 19/008 |
| | | | 381/22 |
| 2012/0183148 A1 | 7/2012 | Cho et al. | |
| 2012/0226494 A1 | 9/2012 | Ejima | |
| 2012/0243690 A1* | 9/2012 | Engdegard | G10L 19/008 |
| | | | 381/22 |
| 2012/0259643 A1* | 10/2012 | Engdegard | G10L 19/008 |
| | | | 704/500 |
| 2012/0263308 A1* | 10/2012 | Herre | G10L 19/008 |
| | | | 381/22 |
| 2012/0269353 A1* | 10/2012 | Herre | G10L 19/008 |
| | | | 381/22 |
| 2013/0132098 A1* | 5/2013 | Beack | H04S 7/30 |
| | | | 704/500 |

FOREIGN PATENT DOCUMENTS

| | | |
|---|---|---|
| KR | 10-2009-0028723 A | 3/2009 |
| KR | 10-2009-0039642 A | 4/2009 |
| KR | 10-2010-0008355 A | 1/2010 |
| KR | 10-2010-0060449 A | 6/2010 |

OTHER PUBLICATIONS

International Search Report dated Jul. 16, 2012 in corresponding International Patent Application No. PCT/KR2011/009971 ( 7 pages in Korean with English Translation).

\* cited by examiner

BROADCAST TRANSMITTING APPARATUS AND BROADCAST TRANSMITTING METHOD FOR PROVIDING AN OBJECT-BASED AUDIO, AND BROADCAST PLAYBACK APPARATUS AND BROADCAST PLAYBACK METHOD

CROSS-REFERENCE TO RELATED APPLICATIONS

This application is a Continuation of U.S. patent application Ser. No. 15/230,616 filed on Aug. 8, 2016, which is a Continuation of U.S. patent application Ser. No. 13/996,852 filed on Jun. 21, 2013, which is a National Stage of International Application No. PCT/KR2011/009971, filed Dec. 22, 2011 and published as WO 2012/087042 on Jun. 28, 2012, which claims the benefit under 35 U.S.C. § 119(a) Korean Patent Application No. 10-2010-0132665, filed on Dec. 22, 2010, in the Korean Intellectual Property Office, the entire disclosures of which are incorporated herein by reference for all purposes.

TECHNICAL FIELD

The present invention relates to a technology that may provide an object-based audio by encoding and DECODING A MULTICHANNEL AUDIO SIGNAL.

BACKGROUND ART

An object-based audio service enables a user to listen to audio while controlling various sound sources included in the audio. In general, in music, a voice of a singer, and a musical instrument, such as a guitar, a piano, a bass, and the like are mixed. Unlike a general audio service, in the object-based audio service, various musical instruments, a voice of a singer, and the like may be independently encoded, or stored and/or transmitted, rather than being mixed. When the object-based audio service is used, a playback terminal may individually control only a voice of a singer, or each musical instrument.

However, since encoding and decoding may be independently performed for each audio object in the object-based audio service, the object-based audio service may be incompatible with a broadcasting system, such as a Digital Television (DTV), a Digital Multimedia Broadcasting (DMB) system, a Digital Audio Broadcasting (DAB) system, and the like. In other words, it is difficult to control audio signals for each object in a broadcast transmitting and playback apparatus, such as a DTV, a DMB system, a DAB system, and the like in the broadcasting system.

Accordingly, there is a desire for a technology that may provide an object-based audio service in a broadcasting system, such as a DTV, a DMB system, a DAB system, and the like.

DISCLOSURE OF INVENTION

Technical Goals

An aspect of the present invention provides a broadcast transmitting apparatus and method, and a broadcast playback apparatus and method that may provide an object-based audio service using audio identification information in a broadcasting system, such as a Digital Television (DTV), a Digital Multimedia Broadcasting (DMB) system, a Digital Audio Broadcasting (DAB) system, and the like.

Technical Solutions

According to an aspect of the present invention, there is provided a broadcast transmitting apparatus, including an audio encoder to encode a multichannel audio signal, and an audio identification information generator to generate audio identification information, the audio identification information being used to determine whether the multichannel audio signal is an object-based audio signal.

The broadcast transmitting apparatus may further include a video encoder to encode a video signal.

The broadcast transmitting apparatus may further include a packetizing and multiplexing unit to packetize the audio identification information, mixing information, and the encoded multichannel audio signal, and to multiplex the packetized audio identification information, the packetized mixing information, and the packetized multichannel audio signal.

When the multichannel audio signal is determined to be the object-based audio signal, the audio identification information generator may generate at least one piece of mixing information including a scheme of mixing channels.

The audio identification information generator may generate the audio identification information in the form of a descriptor.

According to another aspect of the present invention, there is provided a broadcast transmitting method including encoding a multichannel audio signal, and generating audio identification information, the audio identification information being used to determine whether the multichannel audio signal is an object-based audio signal.

The broadcast transmitting method may further include packetizing the audio identification information, mixing information, and the encoded multichannel audio signal, and multiplexing the packetized audio identification information, the packetized mixing information, and the packetized multichannel audio signal.

According to still another aspect of the present invention, there is provided a broadcast playback apparatus, including a multichannel audio signal determining unit to determine whether a multichannel audio signal is an object-based audio signal, based on audio identification information extracted from a bitstream, and an audio decoder to decode an encoded multichannel audio signal.

When at least one piece of mixing information is input, a downmixing unit in the broadcast playback apparatus may downmix the multichannel audio signal to a stereo audio signal, based on mixing information set as default information among the input mixing information.

When at least one piece of mixing information is input, the downmixing unit may downmix the multichannel audio signal to the stereo audio signal, based on mixing information selected by a user operation from among the input mixing information.

The downmixing unit may downmix the multichannel audio signal to the stereo audio signal, based on mixing information input by a user operation.

According to yet another aspect of the present invention, there is provided a broadcast playback method, including determining whether a multichannel audio signal is an object-based audio signal, based on audio identification information, and decoding an encoded multichannel audio signal.

BEST MODE FOR CARRYING OUT THE INVENTION

Figure 1:
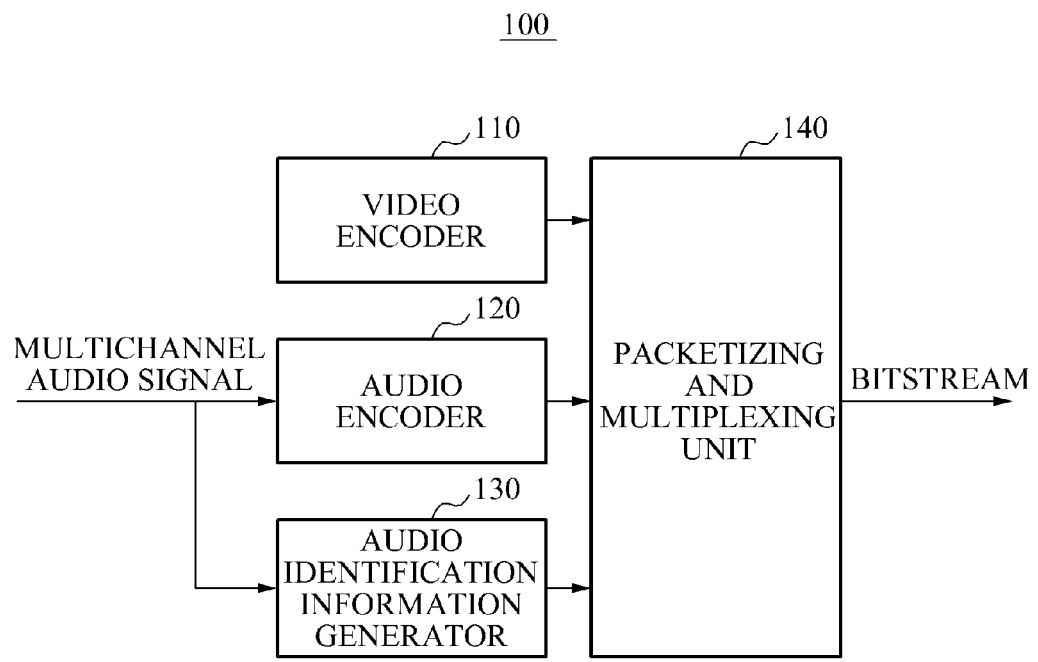
FIG. 1 is a block diagram illustrating a configuration of a broadcast transmitting apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a configuration of a broadcast transmitting apparatus according to an embodiment of the present invention.

Referring to FIG. 1, a broadcast transmitting apparatus 100 may include a video encoder 110, an audio encoder 120, an audio identification information generator 130, and a packetizing and multiplexing unit 140.

The video encoder 110 may encode a video signal using various compression algorithms, such as a Moving Picture Experts Group (MPEG), and the like.

The audio encoder 120 may encode a multichannel audio signal.

The audio identification information generator 130 may generate audio identification information. The audio identification information may be used to determine whether the multichannel audio signal is an object-based audio signal, or a surround audio signal.

The audio identification information may be generated in the form of a descriptor by the audio identification information generator 130. The audio identification information in the form of the descriptor may be inserted into a PMT (Program Map Tale) of an MPEG-2 Transport Stream (TS), and may be transmitted to a broadcast playback apparatus.

Additionally, the audio identification information generator 130 may generate at least one piece of mixing information including a scheme of mixing channels. For example, when the multichannel audio signal is an object-based audio signal, the audio identification information generator 130 may generate audio identification information in which the mixing information is inserted. Similarly, the audio identification information in which the mixing information is inserted may be generated in the form of a descriptor by the audio identification information generator 130.

The audio identification information generator 130 may generate mixing information associated with a voice of a singer and the like, a first musical instrument, and a second musical instrument. For example, the audio identification information generator 130 may generate first mixing information used to mix the voice, the first musical instrument, and the second musical instrument in a ratio of '1:1:1', may generate second mixing information used to mix the voice, the first musical instrument, and the second musical instrument in a ratio of '1:0:1', and may generate third mixing information used to mix the voice, the first musical instrument, and the second musical instrument in a ratio of '1:1:0'. Additionally, the audio identification information generator 130 may generate audio identification information in which the first mixing information through the third mixing information are inserted. Here, one of the first mixing information through the third mixing information may be set in advance as default information.

The packetizing and multiplexing unit 140 may individually packetize the encoded video signal, the encoded audio signal, and the audio identification information. Additionally, the packetizing and multiplexing unit 140 may generate a single bitstream by multiplexing the packetized video signal, the packetized audio signal, and the packetized audio identification information. The broadcast transmitting apparatus 100 may transmit the generated bitstream to the broadcast playback apparatus.

The broadcast transmitting apparatus of FIG. 1 may store the encoded multichannel audio signal, and the audio identification information in a storage medium, such as a Universal Serial Bus (USB), an external hard disc, a Blu-ray disc, DVD, and the like. Here, the audio identification information may be stored in the form of a descriptor, in the storage medium.

Additionally, the broadcast transmitting apparatus of FIG. 1 may include, for example, a portable terminal, a home terminal, a vehicle terminal, and the like that may function as a Digital Television (DTV), a Digital Multimedia Broadcasting (DMB) system, a Digital Audio Broadcasting (DAB) system, and the like.

Figure 2:
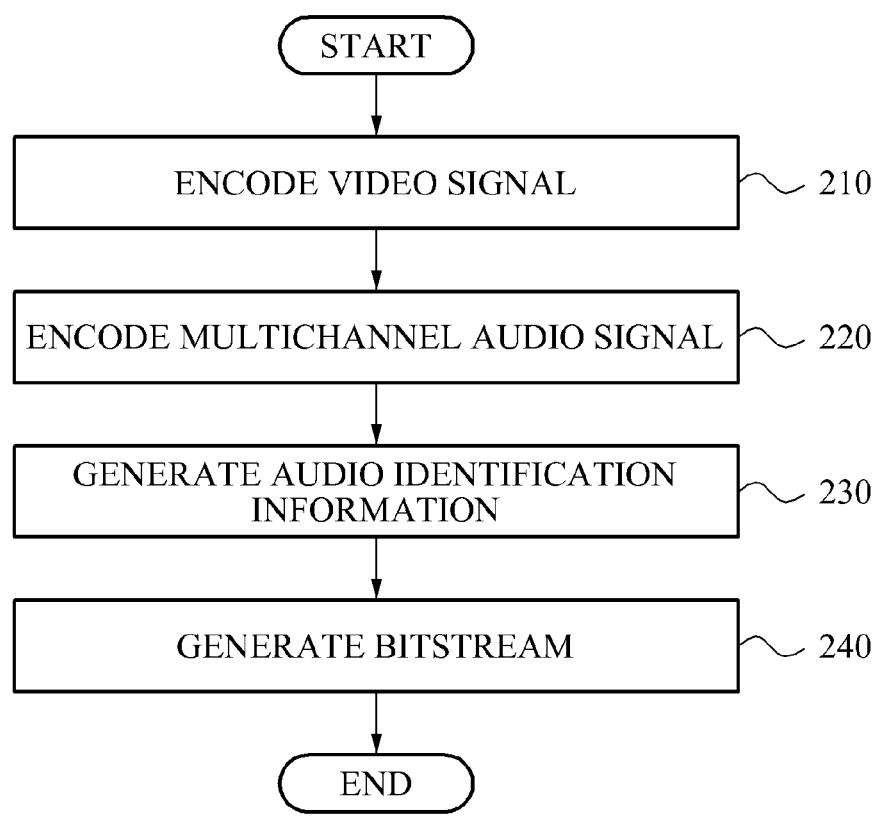
FIG. 2 is a flowchart illustrating an operation of a broadcast transmitting apparatus according to an embodiment of the present invention.

FIG. 2 is a flowchart illustrating an operation of a broadcast transmitting apparatus according to an embodiment of the present invention.

In operation 210, the broadcast transmitting apparatus may encode a video signal using a video compression algorithm, such as an MPEG-2, High Efficiency Video Coding (HEVC), and the like.

In operation 220, the broadcast transmitting apparatus may encode a multichannel audio signal using an audio compression algorithm, such as Audio Coding-3 (AC-3), Advanced Audio Coding (AAC), Bit-Sliced Arithmetic Coding (BSAC), and the like.

In operation 230, the broadcast transmitting apparatus may generate audio identification information. The audio identification information may be used to determine whether the multichannel audio signal is an object-based audio signal, or a surround audio signal. The audio identification information may be generated, for example, in the form of a descriptor.

The broadcast transmitting apparatus may generate at least one piece of mixing information including a scheme of mixing channels. For example, when the multichannel audio signal is an object-based audio signal, the broadcast transmitting apparatus may generate audio identification information in which the mixing information is inserted. Here, the audio identification information in which the mixing information is inserted may be generated in the form of a descriptor.

In operation 240, the broadcast transmitting apparatus may generate a single bitstream, by individually packetizing the encoded video signal, the encoded audio signal, and the audio identification information, and by multiplexing the packetized video signal, the packetized audio signal, and the packetized audio identification information.

An order of operations 210 through 230 of FIG. 2 may be changed. In other words, the encoding of the video signal, the encoding of the multichannel audio signal, and the generating of the audio identification information may be performed in a different order from that shown.

In FIG. 2, the broadcast transmitting apparatus may store, in a storage medium, the encoded multichannel audio signal and the audio identification information. Here, the audio identification information may include at least one piece of mixing information. Additionally, the stored audio identification information may be in the form of a descriptor.

Figure 3:
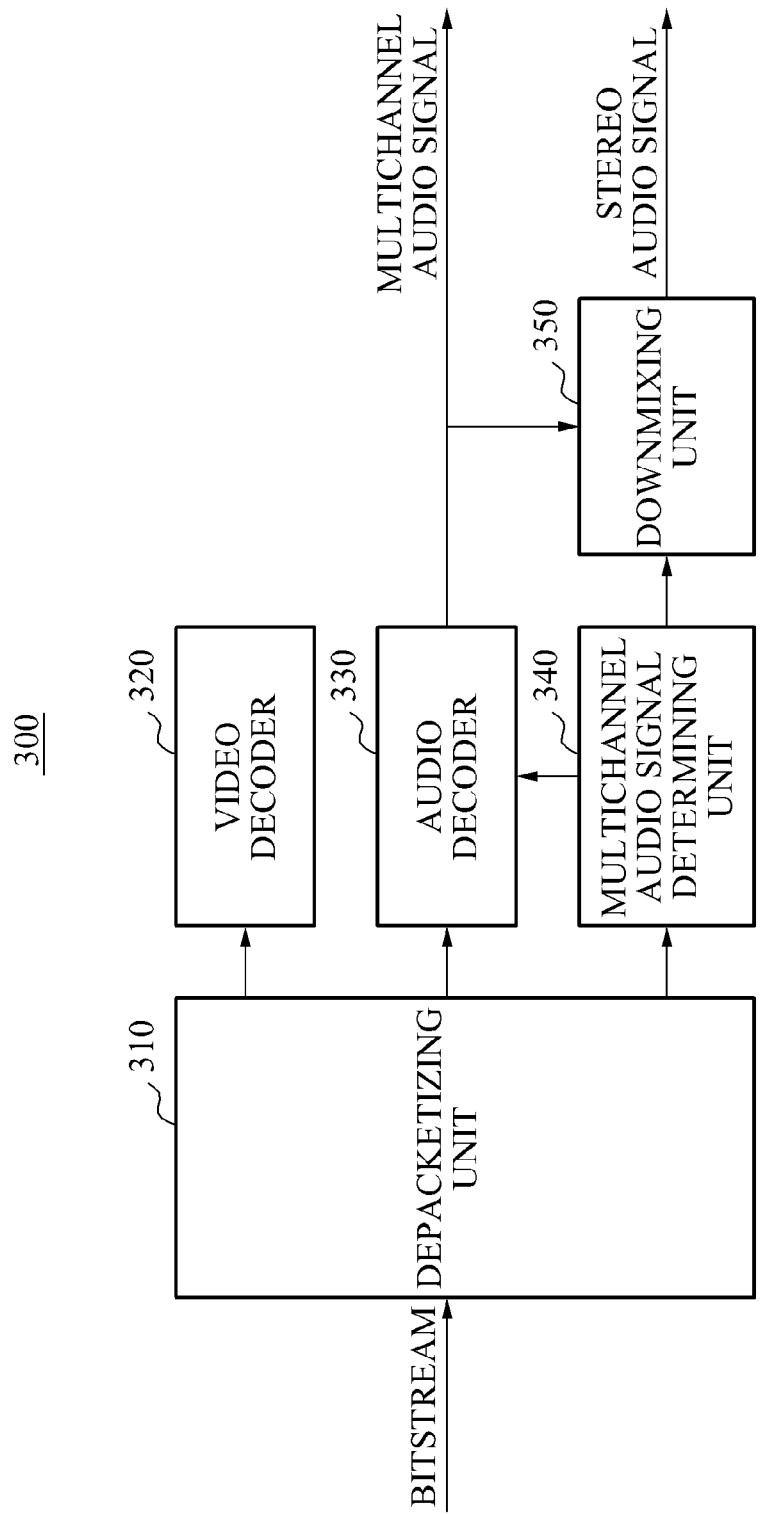
FIG. 3 is a block diagram illustrating a configuration of a broadcast playback apparatus according to an embodiment of the present invention.

FIG. 3 is a block diagram illustrating a configuration of a broadcast playback apparatus according to an embodiment of the present invention.

Referring to FIG. 3, a broadcast playback apparatus 300 may include a depacketizing unit 310, a video decoder 320, an audio decoder 330, a multichannel audio signal determining unit 340, and a downmixing unit 350.

The depacketizing unit 310 may demultiplex and depacketize a bitstream.

For example, the depacketizing unit 310 may demultiplex a bitstream received from a broadcast transmitting apparatus, and may extract, from the bitstream, an encoded multichannel audio signal, an encoded video signal, and audio identification information. Here, the audio identification information may include at least one piece of mixing information.

Additionally, the depacketizing unit 310 may individually depacketize the encoded multichannel audio signal, the encoded video signal, and the audio identification information.

The video decoder 320 may decode the encoded video signal, based on video information included in signaling information.

The audio decoder 330 may decode the encoded multichannel audio signal, based on audio information included in the signaling information. Here, the signaling information may be included in the bitstream, and received from the broadcast transmitting apparatus.

The multichannel audio signal determining unit 340 may determine, based on the audio identification information, whether the multichannel audio signal is an object-based audio signal, or a surround audio signal. Here, the audio identification information may be in the form of a descriptor.

When the multichannel audio signal is determined to be the surround audio signal, the audio decoder 330 may output the decoded multichannel audio signal, without a change.

When the multichannel audio signal is determined to be the object-based audio signal, the downmixing unit 350 may downmix the multichannel audio signal to a stereo audio signal, based on at least one piece of mixing information. Here, the mixing information may be inserted in the audio identification information, and received from the broadcast transmitting apparatus, or may be input by a user operation.

When the at least one piece of mixing information in the audio identification information is used, the downmixing unit 350 may downmix the multichannel audio signal to the stereo audio signal, based on mixing information set as default information among the at least one piece of mixing information.

In an example in which audio identification information includes first mixing information, second mixing information, and third mixing information, and in which the first mixing information is set in advance as default information, the downmixing unit 350 may downmix the multichannel audio signal to the stereo audio signal, based on the first mixing information. Here, the first mixing information may be used to mix a voice, a first musical instrument, and a second musical instrument in a ratio of '1:1:1', and the second mixing information may be used to mix the voice, the first musical instrument, and the second musical instrument in a ratio of '1:0:1.' Additionally, the third mixing information may be used to mix the voice, the first musical instrument, and the second musical instrument in a ratio of '1:1:0.'

In another example in which the third mixing information is selected by a user operation from among the first mixing information through the third mixing information, the downmixing unit 350 may downmix the multichannel audio signal to the stereo audio signal, based on the third mixing information.

In still another example in which audio identification information includes at least one piece of mixing information, and in which mixing information is input by a user operation, the downmixing unit 350 may downmix the multichannel audio signal to the stereo audio signal, based on the mixing information input by the user operation.

In yet another example in which a user desires to mix the voice, the first musical instrument, and the second musical instrument in a specific ratio, regardless of the first mixing information through the third mixing information, the user may input mixing information used to mix the voice, the first musical instrument, and the second musical instrument in a desired ratio, using an operating unit (not shown) included in the broadcast playback apparatus, or using a remote controller. In this example, when the user inputs mixing information used to mix the voice, the first musical instrument, and the second musical instrument in a ratio of '1:0.5:0.5', the downmixing unit 350 may downmix the multichannel audio signal to the stereo audio signal, based on the ratio of '1:0.5:0.5', to output the stereo audio signal.

Figure 4:
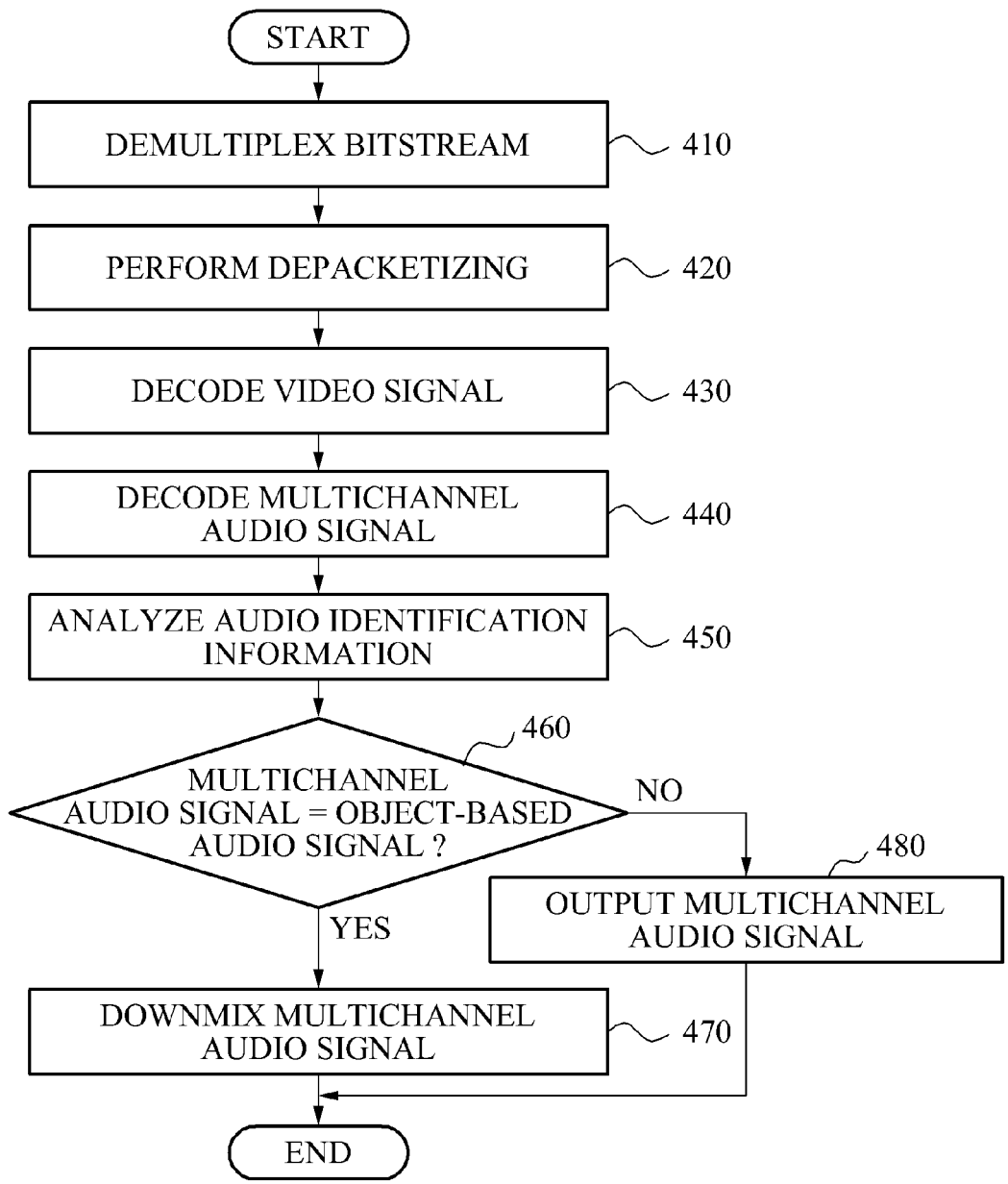
FIG. 4 is a flowchart illustrating an operation of a broadcast playback apparatus according to an embodiment of the present invention.

FIG. 4 is a flowchart illustrating an operation of a broadcast playback apparatus according to an example of the present invention.

In operation 410, the broadcast playback apparatus may demultiplex a bitstream.

By demultiplexing the bitstream, the broadcast playback apparatus may extract, from the bitstream, at least one of an encoded video signal, an encoded multichannel audio signal, and audio identification information. Here, the audio identification information may include at least one piece of mixing information. The audio identification information may be in the form of a descriptor.

In operation 420, the broadcast playback apparatus may individually depacketize the encoded video signal, the encoded multichannel audio signal, and the audio identification information. Here, the audio identification information may include at least one piece of mixing information. The audio identification information may be in the form of a descriptor.

In operation 430, the broadcast playback apparatus may decode the encoded video signal, based on video information included in signaling information. Here, the signaling information may include the video information, audio information, and the like. Additionally, the signaling information may be included in the bitstream, and received from a broadcast transmitting apparatus.

In operation 440, the broadcast playback apparatus may decode the encoded multichannel audio signal, based on the audio information included in the signaling information.

In operation 450, the broadcast playback apparatus may analyze the audio identification information.

Specifically, the broadcast playback apparatus may determine whether the multichannel audio signal is an object-based audio signal, or a surround audio signal, by analyzing the audio identification information.

When the multichannel audio signal is determined to be the object-based audio signal (460:YES), the broadcast playback apparatus may downmix the multichannel audio signal to a stereo audio signal, based on at least one piece of mixing information in operation 470.

Specifically, the broadcast playback apparatus may downmix the multichannel audio signal to the stereo audio signal, based on the at least one piece of mixing information included in the audio identification information.

In an example, the downmixing unit 350 may downmix the multichannel audio signal to the stereo audio signal, based on mixing information set as default information among the at least one piece of mixing information.

In another example, the broadcast playback apparatus may downmix the multichannel audio signal to the stereo audio signal, based on mixing information selected by a user operation from among the at least one piece of mixing information in the audio identification information.

In still another example, the broadcast playback apparatus may downmix the multichannel audio signal to the stereo audio signal, based on mixing information input by a user operation. For example, when a user does not desire to downmix the multichannel audio signal based on the at least one piece of mixing information in the audio identification information, the broadcast playback apparatus may receive mixing information from the user. Additionally, the broadcast playback apparatus may downmix the multichannel audio signal to the stereo audio signal, based on the mixing information received from the user, using an operating unit (not shown) such as a key button, a touch panel, and the like, or using a remote controller.

When the multichannel audio signal is determined to be the surround audio signal (460:NO), the broadcast playback apparatus may output the decoded multichannel audio signal without a change, in operation 480.

An order of operations 430 through 450 of FIG. 6 may be changed. In other words, the decoding of the video signal, the decoding of the multichannel audio signal, and the analyzing of the audio identification information may be performed in a different order from that shown.

The decoding of the multichannel audio signal based on the bitstream received from the broadcast transmitting apparatus, or the downmixing of the multichannel audio signal to the stereo audio signal has been described above with reference to FIGS. 3 and 4. Additionally, the broadcast playback apparatus may output the stereo audio signal, or the decoded multichannel audio signal, based on the encoded multichannel audio signal and the audio identification information that are stored in the storage medium.

The encoding of the video signal and the audio signal, and the generating of the audio identification information have been described with reference to FIGS. 1 through 4, however, processing of the video signal may be omitted. For example, when a radio is used, the broadcast transmitting apparatus of FIGS. 1 and 2 may not require a video encoder to encode a video signal. Similarly, the broadcast playback apparatus of FIGS. 3 and 4 may not require a video decoder to decode a video signal.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A broadcast playback apparatus, comprising:
   a multichannel audio signal determining unit to determine whether an encoded multichannel audio signal in a bitstream is an object-based audio signal, based on audio identification information to indicate whether the multichannel audio signal is an object-based audio signal;
   an audio decoder to decode the encoded multichannel audio signal, when encoded the multichannel audio signal is the object-based audio signal; and
   a downmixing unit to downmix the multichannel audio signal to a stereo audio signal based on (i) mixing information selected by a user from among input mixing information or (ii) mixing information inputted by a user, when the encoded multichannel audio signal is determined to be the object-based audio signal,
   wherein the mixing information is mixing ratio of a sound source related to the object-based audio signal.

2. The broadcast playback apparatus of claim 1, wherein the audio identification information in the form of the descriptor is inserted into a PMT (Program Map Tale) of an MPEG-2 Transport Stream (TS) and is transmitted to the broadcast playback apparatus.

3. A broadcast playback method, comprising:
   determining whether an encoded multichannel audio signal in a bitstream is an object-based audio signal, based on audio identification information to indicate whether the multichannel audio signal is an object-based audio signal;
   decoding the encoded multichannel audio signal, when encoded the multichannel audio signal is the object-based audio signal; and
   downmixing the multichannel audio signal to a stereo audio signal, based on (i) mixing information selected by a user from among input mixing information or (ii) mixing information inputted by a user, when the encoded multichannel audio signal is determined to be the object- based audio signal,
   wherein the mixing information is mixing ratio of a sound source related to the object-based audio signal.

4. The broadcast playback method of claim 3, wherein the audio identification information in the form of the descriptor is inserted into a PMT (Program Map Tale) of an MPEG-2 Transport Stream (TS) and is transmitted to the broadcast playback apparatus.

\* \* \* \* \*